US008373876B2

(12) United States Patent  
Watanabe

(10) Patent No.: US 8,373,876 B2  
(45) Date of Patent: Feb. 12, 2013

(54) DOCUMENT MANAGEMENT SYSTEM AND METHOD FOR CONTROLLING A DOCUMENT PRINT OPERATION

(75) Inventor: Ryutaro Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1729 days.

(21) Appl. No.: 11/342,393

(22) Filed: Jan. 30, 2006

(65) Prior Publication Data

US 2006/0170966 A1    Aug. 3, 2006

(30) Foreign Application Priority Data

Jan. 31, 2005   (JP) ................................. 2005-023937

(51) Int. Cl.  
 G06F 3/12   (2006.01)  
(52) U.S. Cl. ...................................................... 358/1.15  
(58) Field of Classification Search .................. 358/1.15, 358/1.1, 1.13, 1.2  
See application file for complete search history.

(56) References Cited

U.S. PATENT DOCUMENTS

| 5,619,623 | A  | * | 4/1997 | Takayanagi et al. | ......... 358/1.15 |
| 6,418,456 | B1 | * | 7/2002 | Mastie et al. | ................. 707/203 |
| 2005/0063001 | A1 | * | 3/2005 | Tanimoto | ..................... 358/1.15 |

FOREIGN PATENT DOCUMENTS

| JP | 11-105381 | 4/1999 |
| JP | 2002-86813 | 3/2002 |
| JP | 2004-188943 | 7/2004 |

* cited by examiner

Primary Examiner — Benny Q Tieu  
Assistant Examiner — Jeremiah Bryar  
(74) Attorney, Agent, or Firm — Cowan, Liebowitz & Latman, P.C.

(57) ABSTRACT

A document management system and method of efficiently controlling a document print operation that entails storing specifying information pertaining to identification information of document data for a printing apparatus, determining whether or not the document data corresponding to the identification information has been updated after a prior printing of the document, and transmitting to the printing apparatus either the document data or the specifying information depending on the results of the determination.

10 Claims, 9 Drawing Sheets

| DOCUMENT ID | UPDATE FLAG | BOX | FOLDER | FILE NAME | |
|---|---|---|---|---|---|
| 1 | FALSE | 192.192.192.192 | 01 | sample01 | |
| 2 | FALSE | 192.112.192.111 | 01 | sample02 | |
| 3 | TRUE | 192.101.101.101 | 03 | sample03 | |
| | | | | | |

FIG. 3

| DOCUMENT ID | LOCATION | FILE NAME | CATEGORY | KEYWORD |
|---|---|---|---|---|
| 1 | | | | |
| 2 | | | | |
| 3 | | | | |

FIG. 9

| DocID | Updated | BOX | Folder | Name |
|---|---|---|---|---|
| 1 | FALSE | 192.192.192.192 | 01 | sample01 |
| 1 | FALSE | 192.112.192.111 | 01 | sample02 |
| 3 | TRUE | 192.101.101.101 | 03 | sample03 |
| 3 | | | | |

DOCUMENT MANAGEMENT SYSTEM AND METHOD FOR CONTROLLING A DOCUMENT PRINT OPERATION

FIELD OF THE INVENTION

The present invention relates to a printing apparatus having a storage device, and a document management system which manages a document and document information by using a database and, more particularly, to a document management system, printing apparatus, document management apparatus, and the like which can efficiently print a document.

BACKGROUND OF THE INVENTION

Recently, as documents are electronized, it becomes popular to share electronic documents in a server. A client can search for a document managed in the server, and edit or print the document.

In order to efficiently print a document, there is proposed a technique in which a computer that has issued a print request saves print data, monitors a reprint request from a printer, and if receiving a request, retransmits the saved print data to the printer (see Japanese Patent Laid-Open No. 11-105381). There is also proposed a technique in which print data is saved in a printer, and when a document associated with the print data is to be edited by a computer, the document can be edited and printed again on the basis of the print data saved in the printer (see Japanese Patent Laid-Open No. 2002-86813).

By either technique, when a document managed by a server is to be printed by a client, each client must temporarily copy the target electronic document from the server, and issue a print request for the copied document to a printer. This prolongs the time taken for print processing, and increases the load on a network or client. The above-mentioned prior arts try to efficiently achieve print processing (especially reprinting) by temporarily saving print data. According to the invention described in either reference, to reprint from a client, print data is finally transmitted to a printer and printed. It is, therefore, inevitable to increase the traffic in the network environment and decrease the processing efficiency and productivity by repetition of the same processing.

SUMMARY OF THE INVENTION

The present invention has been made in consideration of the above situation, and has as its object to implement efficient print processing in a document sharing environment by reusing resources as much as possible and preventing an increase in traffic in the network environment caused by print processing and a decrease in processing efficiency and productivity by repetition of the same processing.

The present invention has been made to solve the conventional problems, and has the following arrangement.

That is, there is provided a document management system including a printing apparatus and a document management system which manages a document, the printing apparatus comprising
a storage unit which stores print data,
a notification unit which notifies the document management apparatus of specifying information for specifying the print data stored in the storage unit, and
a print control unit which, upon reception of document data from the document management apparatus, prints on the basis of print data associated with the document data and stores the print data in the storage unit, and upon reception of the specifying information, prints on the basis of print data specified by the specifying information, and
the document management apparatus comprising
a storage unit which stores the specifying information notified by the notification unit as association information associated with identification information of the document data, and
a transmission control unit which, for document data having identification information not associated with the specifying information in the association information, transmits print data associated with the document data to the printing apparatus, and for document data having identification information associated with the specifying information, transmits the specifying information to the printing apparatus.

There is provided a printing apparatus which prints in accordance with data transmitted from a document management system that manages a document, comprising
a storage unit which stores print data,
a notification unit which notifies the document management apparatus of specifying information for specifying the print data stored in the storage unit, and
a print control unit which, upon reception of document data from the document management apparatus, prints on the basis of print data associated with the document data and stores the print data in the storage unit, and upon reception of the specifying information, prints on the basis of print data specified by the specifying information.

There is provided a document management apparatus which causes a printing apparatus to print, the printing apparatus printing, upon reception of document data, on the basis of print data associated with the document data, storing the print data, and notifying the document management apparatus of specifying information for specifying the stored print data, and upon reception of the specifying information, printing on the basis of print data specified by the specifying information, comprising
a storage unit which stores specifying information notified by the printing apparatus as association information associated with identification information of document data, and
a print instruction unit which, for document data having identification information not associated with the specifying information in the association information, transmits print data associated with the document data to the printing apparatus, and for document data having identification information associated with the specifying information, transmits the specifying information to the printing apparatus.

According to the present invention, if no document has been updated in reprinting the document, it can be reprinted at high speed. A client need not read document data in reprinting a document, and if no document has been updated, does not transmit any print data to a printer. The load on a network and client is reduced.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a table showing an example of storage of update information and identification information according to the first and second embodiments;

FIG. 3 is a table showing an example of storage of a document database according to the first and second embodiments;

FIG. 9 is a table showing another example of storage of update information and identification information according to the first and second embodiments.

DETAILED DESCRIPTION OF THE PREFERRED EMBODIMENTS

[First Embodiment]
<Document Management System>

Figure 1:
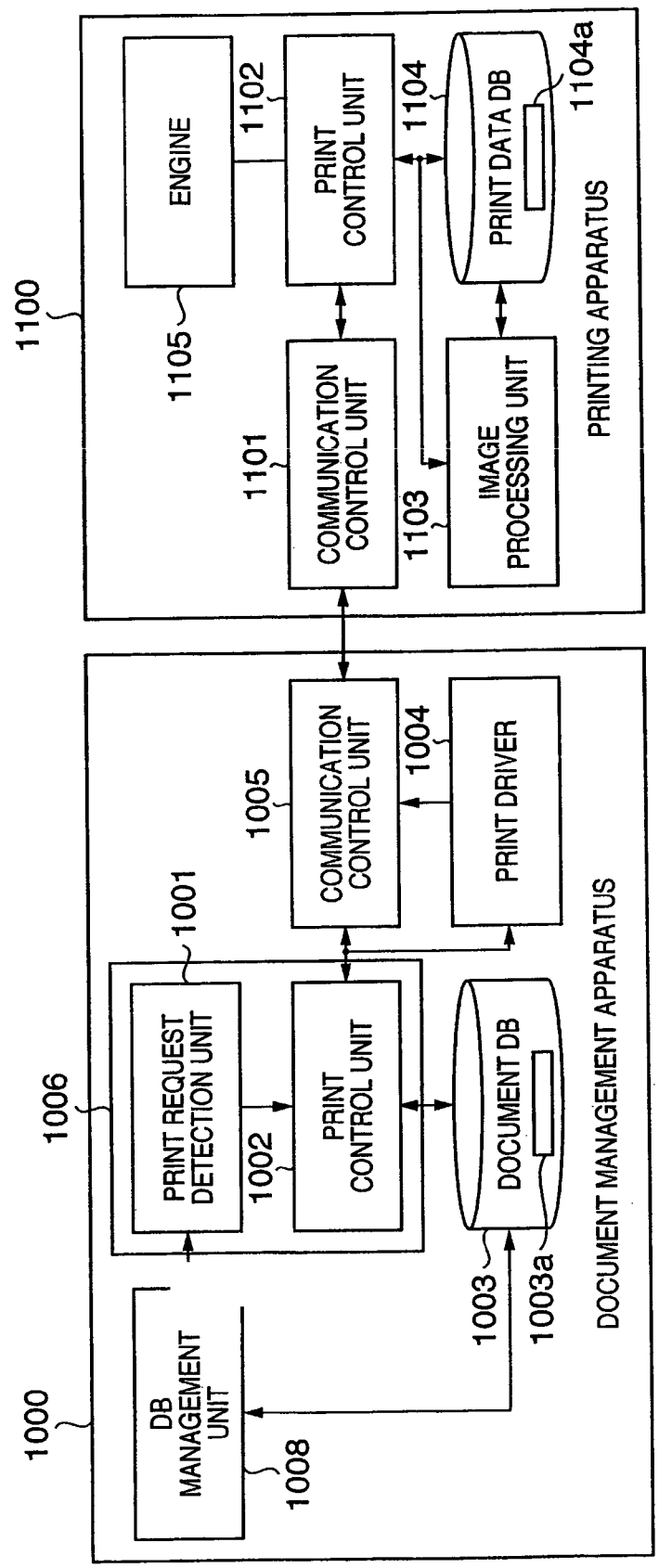
FIG. 1 is a block diagram showing a document management/printing system according to the first embodiment.

FIG. 1 is a block diagram showing a system configuration according to the first embodiment of the present invention. The system configuration according to the first embodiment will be explained with reference to FIG. 1. A document management system 1000 is software which runs on the OS of a computer. More specifically, the document management system is implemented by executing programs including procedures in FIGS. 4, 6, and 7 in a general-purpose computer. A print request detection unit 1001 detects a print request and then transmits it to a print control unit 1002. The print control unit 1002 performs print processing corresponding to various conditions. Upon reception of a print request from the print request detection unit 1001, the print control unit 1002 accesses a document database 1003, and checks whether print data corresponding to a target document to be printed has been stored in a printing apparatus 1100 and whether the document has been changed after the print data is created. The document database is implemented using a storage (e.g., a hard disk) as a storage medium. When print data has been stored in the printing apparatus 1100 and the document has not been changed after storage, the print control unit 1002 acquires identification information of the target document to be printed from the document database 1003, and requests the printing apparatus 1100 via a communication control unit 1005 to print print data corresponding to the identification information. When no print data has been stored in the printing apparatus 1100, or the print data has been stored but the document has been changed after storage, the print control unit 1002 performs printing using a print driver 1004, acquires identification information of print data corresponding to the document from the communication control unit 1005, and stores the identification information in the document database 1003 in correspondence with the document. This procedure will be described later with reference to FIGS. 4 and 5. Note that the print request detection unit 1001 and print control unit 1002 are, e.g., modules of a document editing application program 1006. In general, input/output processing is managed by an operating system (e.g., GDI of Windows®). In FIG. 1, the print control unit 1002 runs on the OS, and its print control procedure does not contain control executed by the operating system. However, the print control procedure can also be implemented as part of the operating system or part of the print driver.

The document database 1003 stores attribute values such as a document body, document name, and index (document ID). When print data corresponding to a document exists in the printing apparatus 1100, for example, identification information for uniquely identifying the print data, and update information which records whether a document has been changed after the print data is created are held as an association information table 1003a representing the association between a document and print data (see FIG. 2). The document body may be separately stored in another document database. As the identification information, the first embodiment uses, e.g., the printer name of the printing apparatus 1100. For a network printer, information as a combination of an IP address, and a folder name and document name in the printing apparatus which stores print data is used as identification information. In order to discriminate identification information of print data from identification information (document ID) of original document data, the former identification information is sometimes called "specifying information" in this specification. The document database 1003 is managed by a database (DB) management unit 1008. The application program 1006 for document editing or the like accesses document data via the DB management unit 1008. In FIG. 1, the print control unit 1002 directly accesses the database. However, access to a database generally requires a predetermined right, or a database can be accessed by only a query of a predetermined format. In this case, the print control unit 1002 may access the document database 1003 via the DB management unit 1008. For a document made up of only an index and document file, the document database can also be configured as merely an index file without using any DB management unit.

The printing apparatus 1100 comprises a storage device. A communication control unit 1101 communicates with the communication control unit 1005 of the document management system 1000 in accordance with an instruction from a print control unit 1102. The print control unit 1102 performs print processing corresponding to various conditions. Upon reception of data to be printed from the communication control unit 1101, the print control unit 1102 properly executes image processing by an image processing unit 1103, executes printing by an engine unit 1105, and stores print data in a print data database 1104. After storage, the print control unit 1102 transmits, to the document management system 1000 via the communication control unit 1101, identification information capable of uniquely identifying the stored print data. Upon reception of identification information (specifying information for specifying a print file) from the communication control unit 1101, the print control unit 1102 acquires, from the print data database 1104, print data uniquely identified by the identification information. The print control unit 1102 appropriately performing image processing for the print data by the image processing unit 1103, and prints the print data.

The image processing unit 1103 properly performs data conversion and image processing in accordance with an instruction from the print control unit 1102. The print data database 1104 stores print data, which is managed so that the print data can be uniquely identified by identification information.

<Association Information Table>

FIG. 2 shows an example of the association information table 1003a. Each record corresponds to one document. Each record contains a document ID, an update flag representing that document data has been updated after final (latest) printing, BOX information (in this example, an IP address) for specifying a printing apparatus or the like (in this example, the printing apparatus 1100) in which print data created from the document data is saved, and the file name and folder of the print data in the apparatus. The BOX information, folder, and file name correspond to specifying information for specifying print data. An update flag "FALSE" represents that no document has been updated, and an update flag "TRUE" represents that a document has been updated. When no print data is saved in the printing apparatus 1100, no corresponding record is recorded in the association information table 1003a. With these record data, print data corresponding to a document in the document management system 1000 can be uniquely identified, and it can be determined whether the corresponding document has been updated after creation of print data. If these data have not been input, it can also be confirmed that no corresponding print data exists. As shown in FIG. 9, print data corresponding to the same document may be stored in a plurality of printing apparatuses. Since the association information table 1003a is directly accessed by the print control unit 1002, it may be managed in the print control unit 1002 by itself separately from the document database 1003. When the print driver 1004 is instructed by the print control unit 1002 to print and receives original document data, it properly performs data conversion and image processing to convert the document data into print data processible by the printing apparatus 1100. Information which includes the print data and is necessary to print is transmitted to the printing apparatus 1100 via the communication control unit 1101. The print driver 1004 may not be included in the document management system 1000. The communication control unit 1005 communicates with the communication control unit 1101 of the printing apparatus 1100 in accordance with an instruction from the print control unit 1002.

<Registration and Update of Document>

Figure 6:
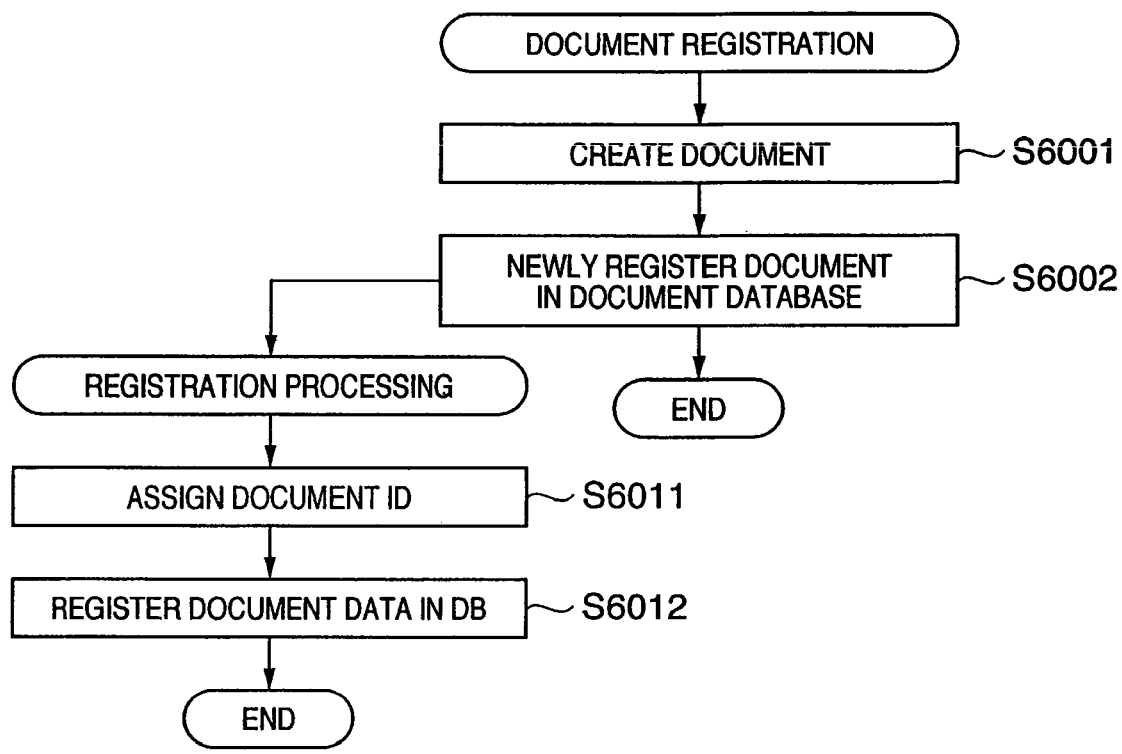
FIG. 6 is a flowchart showing document registration by the document processing system according to the first embodiment and a document management client/master system according to the second embodiment.

FIG. 6 shows a processing procedure when document data is registered in the document database 1003 of the document management system 1000. The programs of procedures in FIGS. 6, 7, and 4 and the like are saved in the file storage of a general-purpose computer which implements the document management system 1000. The programs are loaded into a memory and executed by a processor.

The document editing application 1006 performs document data creation processing (S6001), and the document data is registered in the document database 1003 (S6002). Registration of the document is achieved by the DB management unit 1008. The DB management unit 1008 assigns a unique document ID to new document data (file), and registers the document data in the document database 1003. The document data registered in tile document database 1003 can be searched and read out from the database by a predetermined procedure. FIG. 3 shows an example of a record in the document database. The registered document data contains a unique document ID in the database, the location of the document data, its file name, and information such as a category and keyword for search. In this example, the body of the document data file is saved separately.

Figure 7:
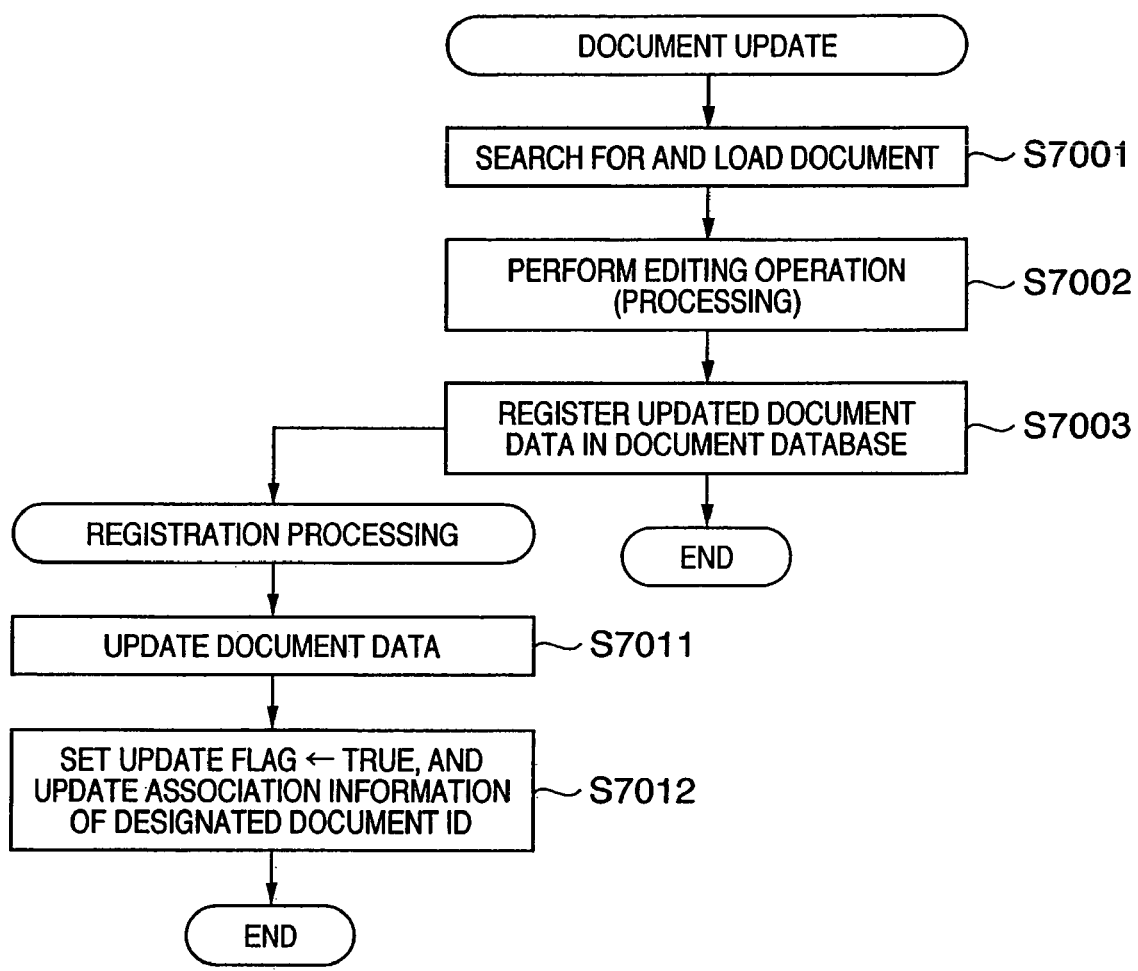
FIG. 7 is a flowchart showing document update by the document processing system according to the first embodiment and the document management client/master system according to the second embodiment.

FIG. 7 shows a procedure in the document management system 1000 when a document data file registered in the document database 1003 is updated. Subsequent to search and load of a document data file to be updated (S7001), editing operation is done by the operator, and editing processing is performed in accordance with the operation (S7002). In accordance with an operation by the operator, the updated document data is registered in the document database 1003 (S7003). The document DB management unit 1008 replaces an original document data file corresponding to the document ID of the updated document data file with the updated document data file (S7011). The association information table 1003a is searched for the document ID of the updated document. If the document ID is hit, the update flag of the record is set to "True". In this manner, document data is registered and managed in the document database. The flow of processing when document data registered in the document database 1003 is printed according to the first embodiment will be explained with reference to FIG. 4.

<Print Control Processing Procedure>

Figure 4:
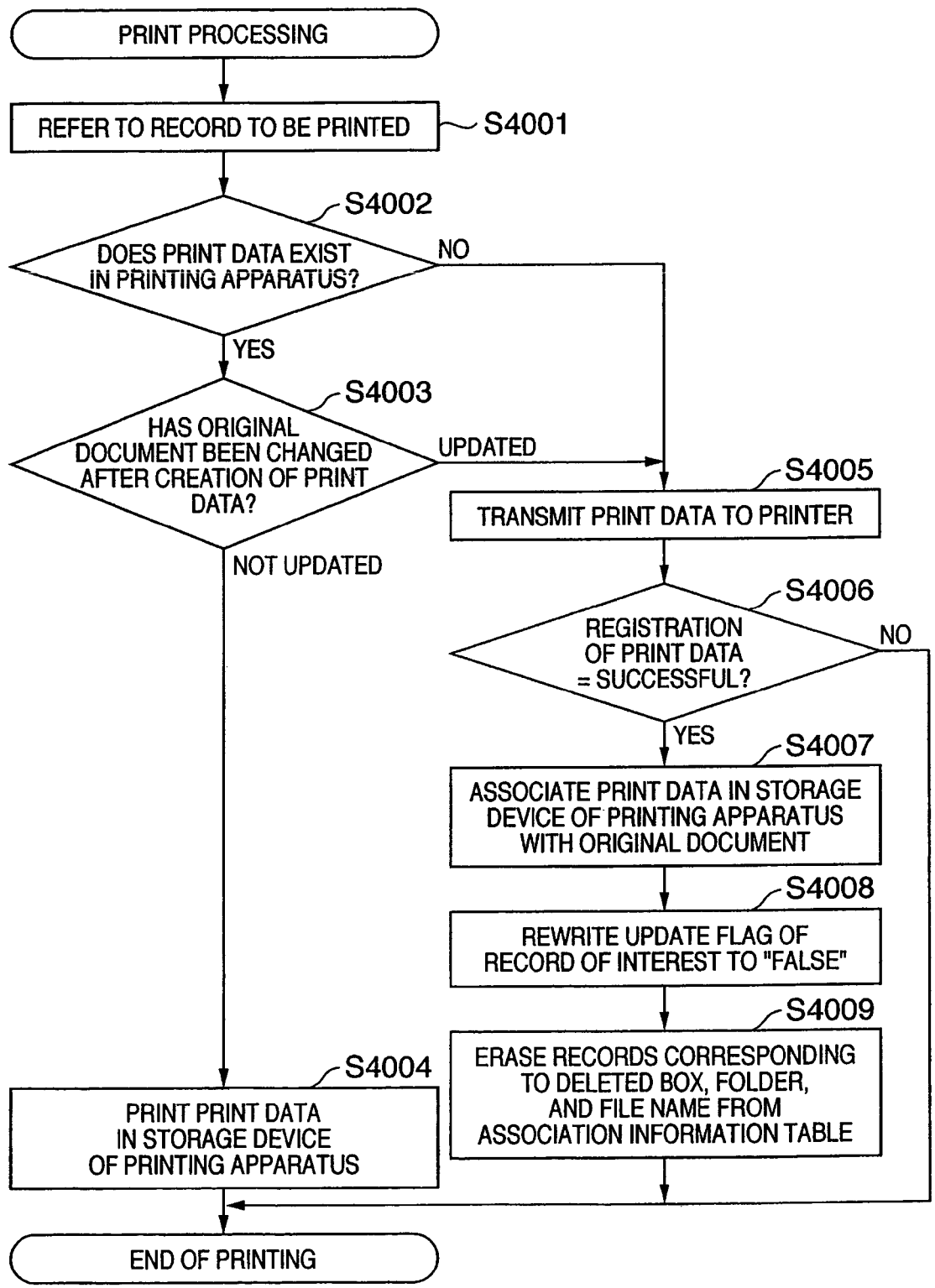
FIG. 4 is a flowchart showing print processing by a document processing system according to the first embodiment and a document management client system according to the second embodiment.

FIG. 4 shows a processing procedure by the print control unit 1002 when a print request is detected. This procedure is executed when, e.g., a print request input by the user is detected by the print request detection unit 1001 and input to the print control unit 1002. A print target is a document read out from the document database 1003, and is specified by the document ID.

In step S4001, the document management system 1000 (especially the print control unit 1002) receives a print request, accesses the association information table 1003a of the document database 1003, and checks whether print data corresponding to a document exists in the printing apparatus.

In step S4002, the print control unit 1002 determines whether the print data is saved in the printing apparatus. If the association information table 1003a is searched for a document ID subjected to printing and the document ID is hit, it can be determined that the print data is saved in the printing apparatus. If the print data is saved in the printing apparatus, the print control unit 1002 determines in step S4003 whether the document data has been updated after final printing. More specifically, the print control unit 1002 determines whether the print data saved in the printing apparatus 1100 coincides with print data converted from document data to be printed. If the update flag is referred to and its value is "True", it can be determined that the print data has been updated.

If the print control unit 1002 determines in step S4002 that no print data is saved, or in step S4003 that the document has been updated, it creates print data from document data and prints. More specifically, the print control unit 1002 transfers the document data to the print driver 1004 to convert it into print data of a predetermined format. Together with the print data, the print control unit 1002 transmits, to the printing apparatus 1100, a print instruction to print on the basis of the print data (S4005). If the print control unit 1002 receives, from the printing apparatus 1100 together with print data specifying information, a response representing that the print data has successively been registered (saved) (S4006), it registers the document ID of the print data and the received specifying information in correspondence with each other as a new record in the association information table 1003a (S4007). The print control unit 1002 sets the update flag of the record to "False" (S4008). If the printing apparatus 1100 deletes existing print data in order to newly register print data, the printing apparatus 1100 sends back specifying information of the deleted print data. In the document management system, the print control unit 1002 deletes, from the document database 1003, a record corresponding to the specifying information of the deleted print data (S4009). Step S4009 is skipped if no corresponding record exists.

If the print data exists in the printing apparatus 1100 in step S4002, and the document has not been updated after final printing in step S4003, printing is executed using the print data saved in the printing apparatus (S4004). In this example, a print instruction to print using the print data specified by a folder and file name as parameters is transmitted to a destination printing apparatus described in the BOX column of the record.

Figure 5:
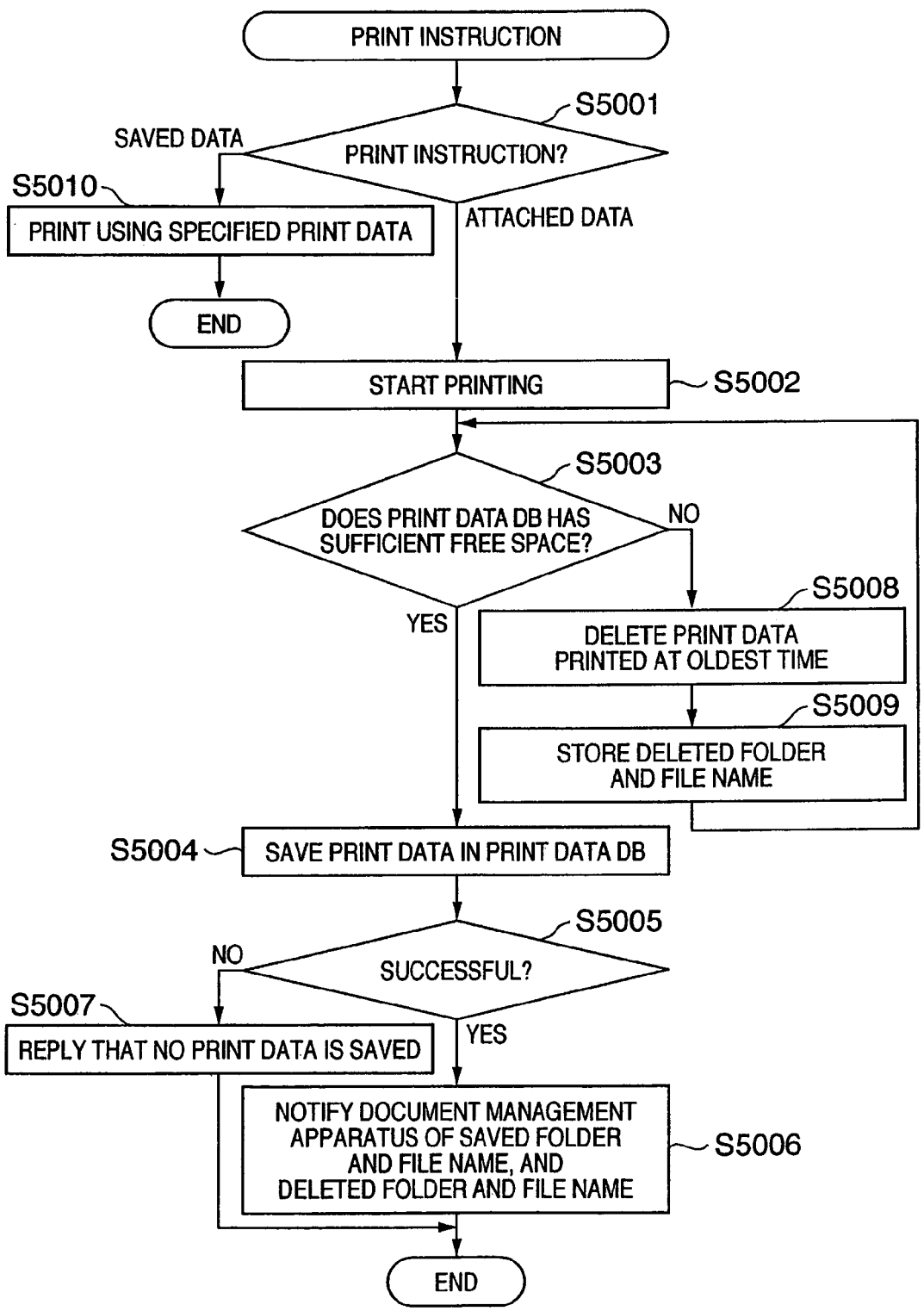
FIG. 5 is a flowchart showing print processing by a printing apparatus according to the first and second embodiments.

FIG. 5 shows a print processing procedure in the printing apparatus 1100. Upon reception of a print instruction, the printing apparatus 1100 determines whether the print instruction is an instruction to print on the basis of print data received together with the print instruction, or an instruction to print on the basis of print data saved in the printing apparatus (S5001). For the instruction to print using saved print data, the printing apparatus 1100 prints in step S5010 on the basis of a print data file specified by specifying information, i.e., a folder name and file name attached to the instruction. If any processing (e.g., rasterization) is necessary, it is executed. Note that the print data database 1104 holds the save time or time information used for final printing, in addition to the print data file. In step S5001, time information corresponding to print data used for printing is updated to the current time.

For the instruction to print using print data attached to the print instruction, the printing apparatus 1100 starts printing using the print data (S5002). The printing apparatus 1100 determines whether the print data database 1104 has a free space for saving new print data (S5003).

If the printing apparatus 1100 determines in step S5003 that the database is full, it refers to time information to determine print data which has been saved or used at the oldest time, and then deletes the print data, in order to ensure a free space (S5008). The printing apparatus 1100 stores the folder and file name of the deleted print data file (S5009). This processing is repeated until a sufficient free space is ensured. When a plurality of files are deleted, a list of their folders and file names is stored.

If the printing apparatus 1100 determines in step S5003 that the database has a free space, it saves the received print data in the print data database (S5004). If save is successful, the printing apparatus 1100 notifies the document management system 1000 of the folder and file name of the saved print data (S5006). At this time, if the file name and folder of deleted print data are stored in step S5009, the printing apparatus 1100 notifies the document management system 1000 of information on the file name and folder, too. If save of the print data fails, the printing apparatus 1100 replies, to the document management system, that no print data is saved (S5007). When print data is saved, the current time is written as time information of the saved file.

As a processing method when the print data database is full, another method can also be adopted. For example, when a predetermined time lapses after save, data is autonomously erased from the printing apparatus 1100. In this case, time information when a print file is saved is saved together with a print data file, and for example, periodically compared with the current time. If a predetermined time or more elapses, the print data file is deleted. In delete, the document management system 1000 may be notified of specifying information on the deleted print data file. Alternatively, a response representing that no corresponding print data exists may be sent back upon reception of a print instruction to cause the document management system 1000 to transmit print data again. In the former case, a record corresponding to print data whose deletion has been announced must be deleted from the association information table in the document management system. The method of deleting print data upon the lapse of a predetermined time can also be employed in combination with the above-described method of deleting a file having the oldest access time.

By the above configuration and processing procedures, the document management apparatus (document management system) according to the first embodiment holds association information representing the association between print data saved in the printing apparatus and document data. When printing is done using print data saved in the printing apparatus, no generation processing and transmissions processing for the print data need be performed. It becomes possible to lighten the processing load, reduce the transmission data amount, and speed up print processing.

Note that the print control unit 1002 directly accesses the document database 1003 in the first embodiment, but may access it via the DB management unit 1008.

[Second Embodiment]

Figure 8:
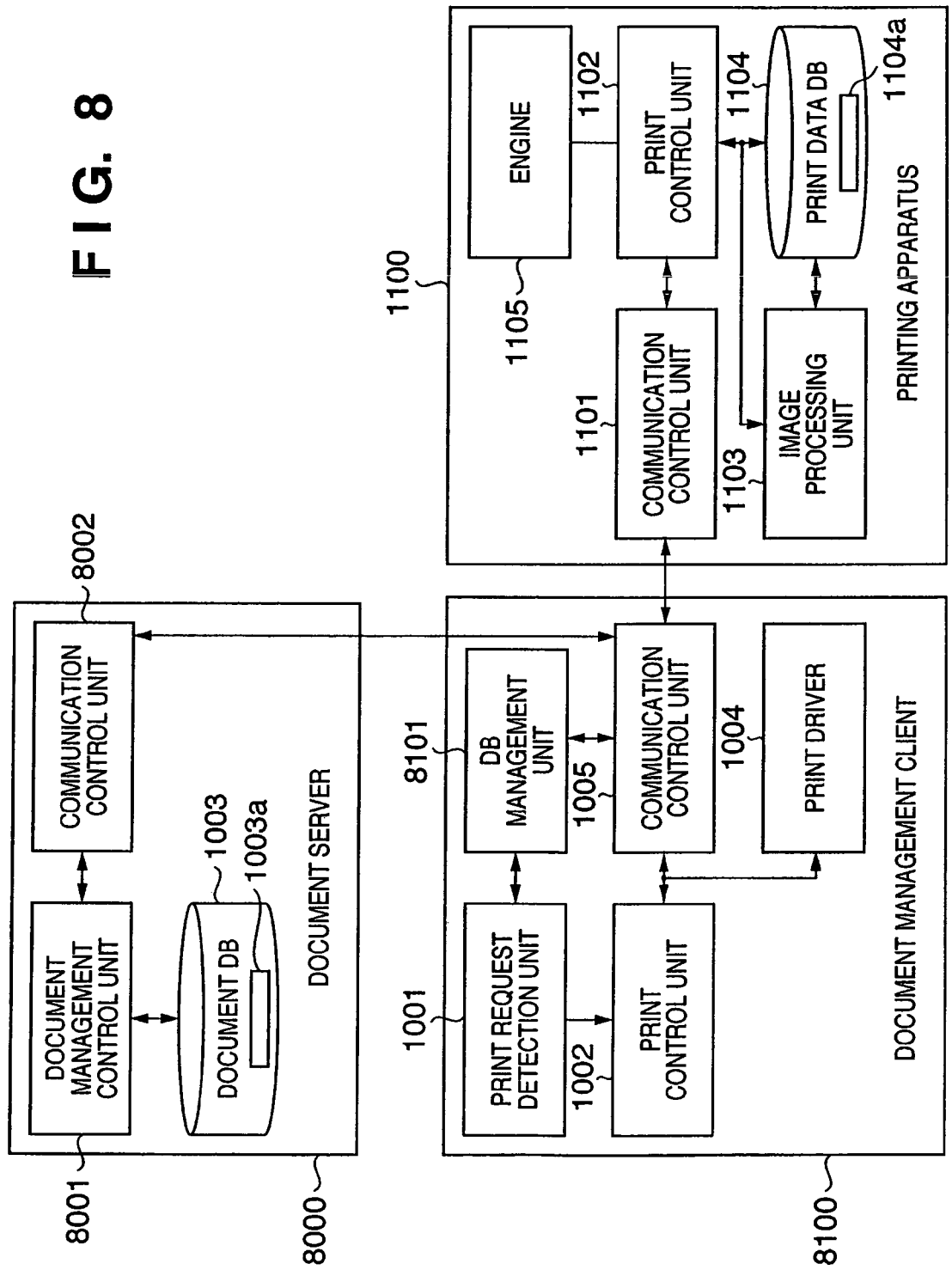
FIG. 8 is a block diagram showing a document management/printing system according to the second embodiment.

The document management system according to the first embodiment may take a client-server form as shown in FIG. 8. The system configuration in the second embodiment will be explained. The same reference numerals denote the same building components as those in the first embodiment. In FIG. 8, reference numeral 8000 denotes a document management system server which is software running on the OS of a computer. Reference numeral 8001 denotes a document management control unit which provides access to a proper document database 1003 in accordance with a request. Reference numeral 8002 denotes a communication control unit which communicates with a communication control unit 1005 of a document management system client 8100, as needed.

The document database 1003 stores attribute values such as a document body, document name, and index. When print data corresponding to a document exists in a printing apparatus 1100, the document database 1003 holds, as attribute values, identification information for uniquely identifying the print data, and update information which records whether a document has been changed after the print data is created. The document body may be separately stored in another document database. As the identification information, the document database 1003 may hold the printer name of the printing apparatus 1100, or for a network printer, a combination of an IP address, and a folder name and document name in the storage device of the printing apparatus in which print data is stored. Contents stored in the document database 1003 are identical to those of the document database in the first embodiment.

The document management system client 8100 is software which runs on the OS of a computer.

Reference numeral 1001 denotes a print request detection unit which detects a print request and then transmits it to a print control unit 1002. The print control unit 1002 performs print processing corresponding to various conditions. Upon reception of a print request from the print request detection unit 1001, the print control unit 1002 accesses the document database 1003 of the document management server 8000 via the communication control unit 1005, and checks whether print data corresponding to a target document to be printed has been stored in the printing apparatus 1100 and whether the document has been changed after the print data is created. When the print data has been stored in the printing apparatus 1100 and the document has not been changed after storage, the print control unit 1002 acquires identification information of the target document to be printed from the document database 1003, and requests the printing apparatus 1100 via the communication control unit 1005 to print print data corresponding to the identification information. When no print data has been stored in the printing apparatus 1100, or the print data has been stored but the document has been changed after storage, the print control unit 1002 performs printing using a print driver 1004, acquires identification information of print data corresponding to the document from the communication control unit 1005, and stores the identification information in the document database 1003 via the communication control unit 1005 in correspondence with the document. The communication control unit 1005 communicates with the communication control unit 1101 of the printing apparatus 1100 in accordance with an instruction from the print control unit 1002. The print driver 1004 appropriately performs data conversion and image processing upon reception a print instruction from the communication control unit 1005, and transmits information necessary to print to the printing apparatus 1100 via the communication control unit 1005. The print driver 1004 may not be included in the document management system client 8100. A DB management unit 8101 is client software for accessing the document database 1003.

The printing apparatus 1100 comprises a storage device. Reference numeral 1101 denotes a communication control unit which communicates with the communication control unit 1005 of the document management system client 8100 in accordance with an instruction from a print control unit 1102. The print control unit 1102 performs print processing corresponding to various conditions. Upon reception of data to be printed from the communication control unit 1101, the print control image processing unit 1103, executes printing, and stores print data in a print data database 1104. After storage, the print control unit 1102 transmits, to the document management system client 8100 via the communication control unit 1101, identification information capable of uniquely identifying the stored print data. Upon reception of identification information from the communication control unit 1101, the print control unit 1102 acquires, from the print data database 1104, data uniquely identified by the identification information. The print control unit 1102 appropriately performs image processing by the image processing unit 1103, and executes printing by an engine unit 1105. The image processing unit 1103 properly performs data conversion and image processing in accordance with an instruction from the print control unit 1102. The print data database 1104 stores print data, which is managed so that the print data can be uniquely identified by identification information. In this case, reprinting can be achieved at high speed for even a print request from a different computer.

The operation in the second embodiment is the same as that in the first embodiment except that the document database 1003 is managed by the independent database server 8000. More specifically, a combination of the document management server 8000 and document management client 8100 in the second embodiment corresponds to the document management system 1000 in the first embodiment. In the second embodiment, the print control unit 1002 always accesses an association information table 1003*a* via the document management control unit 8001 of the server 8000, unlike the first embodiment in which the print control unit 1002 directly accesses the association information table 1003*a*. However, the second embodiment is a variation of the invention in which a document is managed in a server. The gist of the present invention is common between the first and second embodiments in that the data amount to be transmitted/received can be decreased and the processing time can be shortened by saving print data in a printing apparatus, and saving and maintaining document data and association information between the document data and its print data.

As has been described above, the document management system according to the above embodiments can reprint at high speed in reprinting a document. In addition, the load on a network and client can be reduced.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-023937 filed on Jan. 31, 2005, which is hereby incorporated by reference herein in its entirety.

What is claimed is:

1. A document management system including a printing apparatus and a document management apparatus which manages a document,
    said printing apparatus comprising:
        a print data storage unit which stores print data;
        a notification unit which notifies said document management apparatus of specifying information for specifying the print data stored in said print data storage unit; and
        a print control unit which, upon reception of document data from said document management apparatus, prints on the basis of print data associated with the document data and stores the print data in said print data storage unit, and upon reception of the specifying information, prints on the basis of print data specified by the specifying information, and
    said document management apparatus comprising:
        a specifying data storage unit which stores the specifying information notified by said notification unit as association information associated with identification information of the document data; and
        a transmission control unit which, for document data having identification information not associated with the specifying information in the association information, transmits print data associated with the document data to said printing apparatus, and for document data having identification information associated with the specifying information, transmits the specifying information to said printing apparatus,
    wherein the association information further contains update information indicating whether or not document data identified by the identification information contained in the association information has been updated after the last print of the document data,
    wherein said document management apparatus stores the update information for document data which indicates the document data having been updated in a case where the document data has been updated, and
    wherein said transmission control unit transmits to said printing apparatus a print instruction to print the document data with print data associated to the document data corresponding to the update information indicating the document data having been updated.

2. The system according to claim 1, wherein said printing apparatus deletes the stored print data to reserve a room for storage and informs said document management apparatus of the specifying information of the deleted print data in a case where receiving document data corresponding to the update information indicating the document data having been updated, and
    wherein said document management apparatus erases the specifying information of the deleted print data from the association information in a case where receiving the specifying information of the deleted print data.

3. The system according to claim 1, wherein
    in a case where said print data storage unit has no room for storing print data, said printing apparatus deletes stored print data to ensure a room for storing print data, and notifies said document management apparatus of specifying information of the deleted print data, and upon reception of the notification of the specifying information of the deleted print data, said document management apparatus erases the specifying information of the deleted print data from the association information.

4. The system according to claim 1, wherein said document management apparatus further comprises a document save unit which saves document data in association with the identification information.

5. The system according to claim 1, wherein upon reception of a print instruction together with document data from said document management apparatus, said print control unit prints on the basis of print data associated with the document data and stores the print data in said print data storage unit, and upon reception of a print instruction together with the specifying information, prints on the basis of print data specified by the specifying information, and for document data having identification information not associated with the specifying information, said transmission control unit transmits a print instruction together with print data associated with the document data to said printing apparatus, and for document data having identification information associated with the specifying information, transmits a print instruction together with the specifying information to said printing apparatus.

6. A document management apparatus which causes a printing apparatus to print, the printing apparatus printing, upon reception of document data, on the basis of print data associated with the document data, storing the print data, and notifying the document management apparatus of specifying information for specifying the stored print data, and upon reception of the specifying information, printing on the basis of print data specified by the specifying information, comprising:

a storage unit which stores specifying information notified by the printing apparatus as association information associated with identification information of document data; and a print instruction unit which, for document data having identification information not associated with the specifying information in the association information, transmits print data associated with the document data to the printing apparatus, and for document data having identification information associated with the specifying information, transmits the specifying information to the printing apparatus, wherein the association information further contains update information indicating whether or not document data identified by the identification information contained in the association information has been updated after the last print of the document data, wherein said document management apparatus stores the update information for document data, which indicates the document data having been updated in a case where the document data has been updated, and wherein said print instruction unit transmits to said printing apparatus a print instruction to print the document data with print data associated to the document data corresponding to the update information indicating the document data having been updated.

7. The apparatus according to claim 6, wherein said printing apparatus deletes the stored print data to reserve a room for storage and informs said document management apparatus of the specifying information of the deleted print data in a case where receiving document data corresponding to the update information indicating the document data having been updated, and wherein said document management apparatus erases the specifying information of the deleted print data from the association information in a case where receiving the specifying information of the deleted print data.

8. The apparatus according to claim 6, wherein upon reception of a notification of specifying information of deleted print data from the printing apparatus, the document management apparatus erases the specifying information of the deleted print data from the association information.

9. A document management method of causing a printing apparatus to print, the printing apparatus printing, upon reception of document data, on the basis of print data associated with the document data, storing the print data, and notifying the document management apparatus of specifying information for specifying the stored print data, and upon reception of the specifying information, printing on the basis of print data specified by the specifying information, comprising:

a storage step of storing specifying information notified by the printing apparatus as association information associated with identification information of document data; and a print instruction step of, for document data having identification information not associated with the specifying information in the association information, transmitting the document data to the printing apparatus, and for document data having identification information associated with the specifying information, transmitting the specifying information to the printing apparatus, wherein the association information further contains update information indicating whether or not document data identified by the identification information contained in the association information has been updated after the last print of the document data, wherein the update information for document data, which indicates the document data having been updated is stored by said document management apparatus in a case where the document data has been updated, and wherein a print instruction to print the document data is transmitted from said print instruction unit to said printing apparatus with print data associated to the document data corresponding to the update information indicating the document data having been updated.

10. A program which is recorded on a non-transitory computer-readable recording medium and executed by a computer connected to a printing apparatus, the printing apparatus printing, upon reception of document data, on the basis of print data associated with the document data, storing the print data, and notifying the computer of specifying information for specifying the stored print data, and upon reception of the specifying information, printing on the basis of print data specified by the specifying information, comprising:

a code for a storage step of storing specifying information notified by the printing apparatus as association information associated with identification information of document data; and a code for a print instruction step of, for document data having identification information not associated with the specifying information in the association information, transmitting the document data to the printing apparatus, and for document data having identification information associated with the specifying information, transmitting the specifying information to the printing apparatus wherein the association information further contains update information indicating whether or not document data identified by the identification information contained in the association information has been updated after the last print of the document data,
wherein the update information for document data, which indicates the document data having been updated is stored by said document management apparatus in a case where the document data has been updated, and
wherein a print instruction to print the document data is transmitted from said print instruction unit to said printing apparatus with print data associated to the document data corresponding to the update information indicating the document data having been updated.

* * * * *